Oct. 20, 1964 D. H. SILVERN 3,153,442
HEATING AND AIR CONDITIONING APPARATUS
Filed June 26, 1961
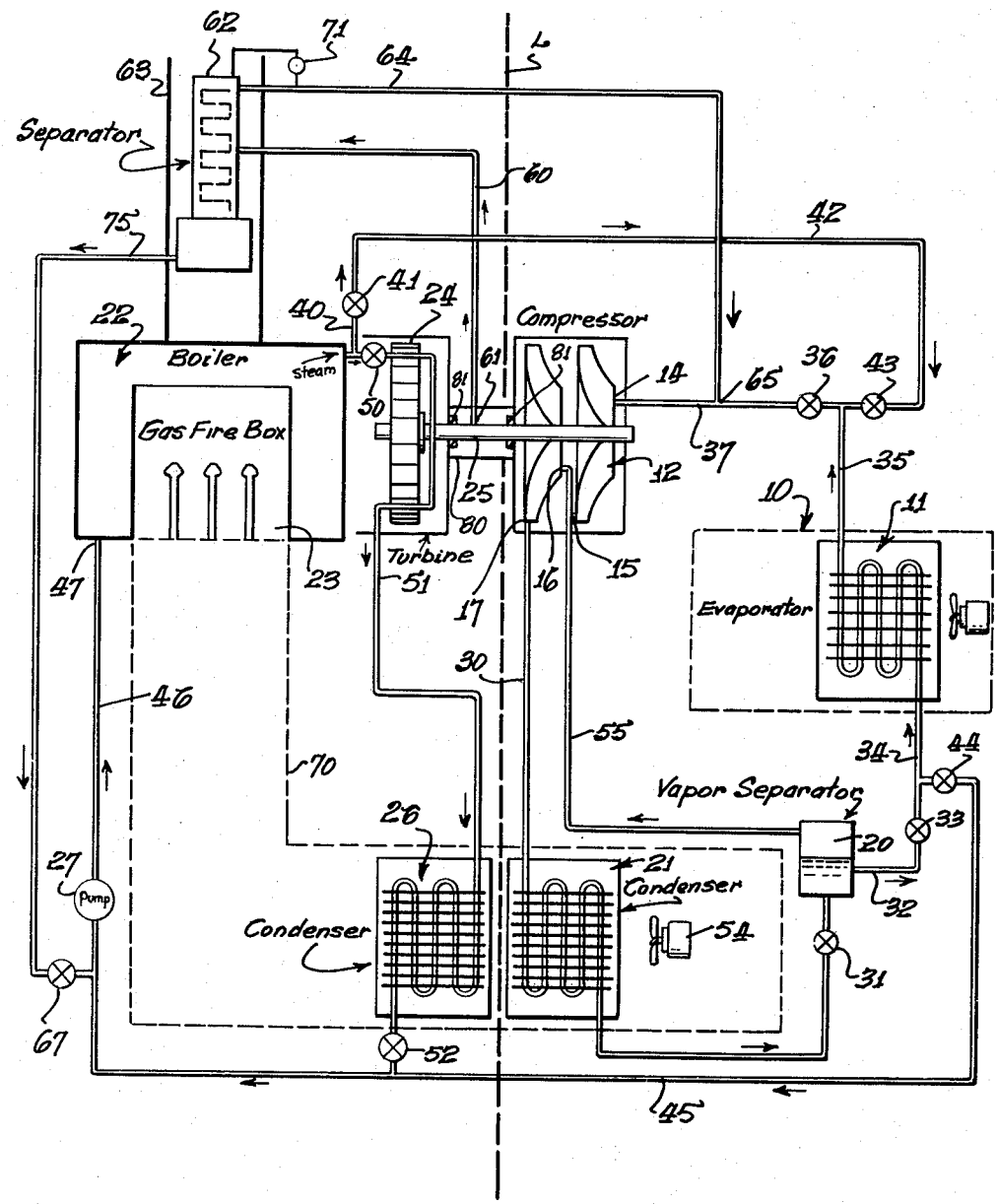
DAVID H. SILVERN,
INVENTOR.
BY HIS ATTORNEYS.
Spensley & Horn.

United States Patent Office 3,153,442
Patented Oct. 20, 1964

3,153,442
HEATING AND AIR CONDITIONING APPARATUS
David H. Silvern, 12143 Emelita St.,
North Hollywood, Calif.
Filed June 26, 1961, Ser. No. 119,490
6 Claims. (Cl. 165—50)

This invention relates to a refrigerating and heating apparatus, and more particularly to a unitary heating and refrigerating apparatus for controlling the temperature within an enclosed space.

For regulating the temperature of an enclosed space, such as a room, truck, storage chamber, and the like, it is desirable to utilize a unitary system in order to employ common units which are capable of serving dual purposes and to maintain a compactness of the apparatus. However, in the prior state of the art unitary systems have been particularly disadvantageous in one respect; namely, that it is difficult, if not impossible, to obtain a single fluid which is efficient for power production, heating, and cooling purposes. Refrigerants such as dichlorodifluoromethane or other fluorinated hydrocarbon compounds, which are non-toxic, stable and generally have good thermodynamic characteristics for use as refrigerants, are commonly utilized in the cooling portion of the heating and cooling apparatus. The choice of the proper refrigerant depends upon the temperature range of heating and cooling, the pressure to be used, and the ability of the fluid to operate in a closed cycle with the proper operating units. With refrigerants of the above type, the gases are compressed, and then the heat withdrawn until a liquid results. The liquid is then allowed to expand in the system under which conditions it again acquires heat, therefore cooling the surrounding medium and thereafter the gas is drawn again through the compressor to begin the cycle again. Such refrigerants are, however, not efficient in the heating portion of the heating and cooling apparatus, since their boiling point is necessarily too low for efficient conduction of heat from the fluid to the space. The heating fluid is also the fluid which is used for power production during the cooling phase. For good thermal efficiency of the apparatus it is necessary to utilize a different fluid in the power loop from that used in the cooling loop of the apparatus.

It is an object of the present invention to provide a unitary heating and refrigerating apparatus which employs a first fluid for purposes of cooling and a second fluid for purposes of heating and power production.

It is another object of the present invention to provide such a unitary apparatus for heating and refrigerating which employs separate fluids for each function, but which is capable of utilizing common units in the apparatus for performing various operations upon the two fluids.

It is a still further object of the present invention to provide such an apparatus using two fluids and common units where possible and which further provides a means for separating the two fluids when admixing thereof occurs.

Yet another object of the present invention is to provide such an apparatus which utilizes a prime mover driven compressor in the system which prime mover is driven by the heating fluid and which compressor is utilized to compress the refrigerating fluid, with means for separating the refrigerating and heating fluids which can become admixed within the prime mover compressor combination.

Yet a further object of the present invention is to provide a unitary heating and refrigerating apparatus in which the heating and cooling fluids are conducted separately through a condenser unit.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

The present invention is a combined unitary heating and refrigerating apparatus which includes a fluid compressor driven by a prime mover mounted upon a common shaft with the compressor. Positioned adjacent the shaft is a leakage conduit through which refrigerating fluid escaping from the compressor and heating and power production fluid escaping from the turbine are conducted to a fluid separator, such as a fractionating column, which separates the heating fluid from the cooling fluid after which the fluids are conducted back to their respective portions of the apparatus.

In the drawing, the figure is a schematic view of a presently preferred embodiment of the present invention.

In the drawing there is shown a schematic illustrative embodiment of the present invention in which various units and elements well-known to the art are employed and are not shown in mechanical detail. Standard units employed in the present invention include units such as a boiler, a fluid-driven prime mover, a fluid compressor, condensers, evaporators, a receiver, pumps, and valves.

In the figure, within the chamber or compartment shown by the dotted lines and designated as 10, there is an evaporator unit 11 which, in the cooling cycle, takes heat from the compartment and is therefore colder than the compartment, and in the heat cycle applies heat to the compartment and therefore under these conditions is warmer than the compartment. Outside of the compartment there is a fluid compressor 12 of the well-known type with a suction inlet at 14 and 16, and pressure outlets at 15 and 17. For purposes of illustration, that portion of the apparatus shown schematically to the left of the dotted line designated L is the heating portion of the apparatus exclusive of the evaporator, while that portion of the apparatus to the right of the dotted line L is the cooling portion of the apparatus. The cooling apparatus also includes a receiver 20 which acts as a vapor separator and a condenser 21. The heating portion of the apparatus includes a boiler 22 to which heat is furnished from a gas fire box 23.

In the presently preferred embodiment of the invention the prime mover 24 is of the turbine type well-known to the art, while the compressor is also of the rotary type. It is to be understood that other types of prime movers and compressors, such as reciprocating piston expander types can also be utilized. The turbine 24 is connected to the compressor 12 by a common shaft 25. A condenser 26 is provided in the heating portion of the apparatus, as is a pump 27, and suitable valves as discussed hereinafter. In accordance with the present invention, a first fluid is used in the cooling portion of the apparatus, while a second fluid is used in the heating portion of the apparatus. In the embodiment shown, the conduits forming the cooling loop extend from the outlet 17 of the compressor 12 through the fluid line 30 which passes through the condenser 21 and through an expansion valve 31 to the receiver 20. A conduit or fluid line 32 extends from the receiver to carry fluid therefrom through a second expansion valve 33, and thence through fluid line 34 to the evaporator 11. From the evaporator 11 the cooling fluid passes through the fluid line 35, the valve 36, and fluid inlet line 37 to the suction side 14 of the compressor 12. The heating loop of the apparatus includes the fluid outlet line 40 extending from the boiler 22 through a valve 41, through the fluid line 42 and the valve 43 into the evaporator 11. From the evaporator 11 the heating fluid passes through the line 34, the valve 44, the fluid return line 45, to the pump 27 and thence upward through fluid line 46 to the return inlet 47 of the boiler.

For purposes of illustration, the cooling fluid used in the presently preferred embodiment of the present invention is "Freon-113," while "Freon-112" is used as the heating fluid of the apparatus. In the cooling cycle of the apparatus the turbine 24 is driven by vapor generated in the boiler which is passed to the turbine through the turbine inlet valve 50 which is in the open position. The vapor passes through the turbine and causes it to be rotated to in turn drive the compressor 12. The vapor emitted from the turbine through the turbine outlet line 51 is conducted through the condenser 26 where it condenses and passes through valve 52, which is in the open position and is then pumped back to the boiler inlet through fluid line 46 by the pump 27. During this cooling cycle, the heating valve 44 is closed as is the heating fluid valve 41, as well as valve 43. Thus, the circuit of the vapor from the boiler is merely through the turbine 24, the condenser 26, the pump 27, and thence back into the boiler such that the fluid in the heating loop acts as the power producing fluid. The refrigerant is compressed in the compressor 12 and is conducted as a hot compressed gas through the high-pressure line 30 and into the condenser 21 where it is cooled by air passed through the condenser by means of an air circulating fan 54. The refrigerant which is then a liquid passes through the expansion valve 31 which is in the open position and into the vapor separator 20. In the vapor separator, any gas which has evaporated from the liquid is conducted through the vapor return line 55 to the compressor inlet 16. The refrigerant in liquid form is then conducted through the valve 33 which is also an expansion valve of the well-known type. In expanding the refrigerant becomes a cold vapor which, when passing through the evaporator 11 extracts heat from the compartment 10, thus cooling the compartment. From the evaporator, the heated vapor passes through the vapor return line 35, the valve 36 which is in the open position, and thence into the compressor 14 to begin a new cycle.

When it is desired to heat the compartment 10, the turbine and compressor are not operated. The turbine inlet valve 50 is closed while the heating valve 41 is open, thus allowing the vapor from the boiler to pass through the valve 41 and into the high-pressure line 42 of the heating system, through the valve 43 which is in the open position, and thence into the evaporator where the vapor gives off its heat of condensation to the compartment. The cooling cycle valve 36 is closed as is the expansion valve 33. Thus, the boiler vapor which has become cooled to a liquid while passing through the evaporator, passes through the line 34, the heating cycle valve 44, and into the return line 45, where it is drawn by the pump 27 back to the boiler inlet 47 through the line 46.

As stated previously, it is difficult to isolate the fluid used to generate the force required to rotate the prime mover from the fluid which is being compressed by the compressor when the turbine and compressor are on a common shaft 65, which is the only practicable way to operate a prime mover driven compressor of the type utilized in such heating and cooling apparatus. In accordance with the present invention, a leakage line 60 is connected to the turbine compressor at the point 61 along the common shaft thereof where the fluid within the compressor is admixed with the fluid driving the turbine. In the embodiment shown a shaft housing 80 surrounds the shaft and suitable seals 81 are positioned within the housing and surrounding the shaft to prevent excessive flow of fluid from the turbine and compressor along the shaft. It can be seen that some leakage along the shaft will occur. Leakage will similarly occur when other types of prime movers and compressors such as reciprocating piston types are used. In the embodiment shown, the line 60 is connected to the shaft housing 80 and is in fluid communication with the surface of the shaft to allow passage of the fluid from the surface of the shaft to the line 60, due to the pressure of the admixed fluids at the shaft surface.

The admixed fluids are then conducted through the line 60 to a separator 62. In the present embodiment, the separator is a fractionating column of the type well-known to the art, wherein heat is supplied to the column to continuously boil and separate mixtures of heating and cooling fluid over a range of saturation temperatures. Because of the different boiling points of the components a different composition of mixture exists at each level of the fractionating column. The lower boiling point component (more volatile) is predominant in the upper portion of the column, whereas the high boiling point component seeks the lower and hotter portion of the column. Thus, with "Freon-112" and "Freon-113" utilized as the two fluids, they are conducted through the line 60 into the separator 62. Heat is supplied from the gas-fired boiler by means of the burner exhaust gases flowing through conduit 63. The lower boiling point component is partially condensed at the reflux condenser 71 and the condensate liquid is returned to the top of the column to maintain reflux liquid flow downward through the fractionating column. The remaining vapor passes from the reflux condenser 71 into the refrigerant return line 64. The low boiling refrigerant is conducted through the line 64 to an inlet point 65 in the vapor return line to the compressor, so that the refrigerant is returned to the cooling cycle portion of the apparatus. The high boiling component remains in liquid form and passes from the fractionating column as the bottom product into the boiler return line 75. The bottom product passes through the line 75 into the liquid return line 45 of the heating portion of the apparatus through the valve 67. Thus, when the valve 67 is open, the heating fluid separated from the refrigerating fluid at the fractionating column is returned by the pump 27 to the boiler where it again enters the heating portion of the apparatus.

By means of the present invention, the condensers 21 and 26 for the cooling and heating portions of the apparatus, respectively, can be contained within a single unit, since the two fluids are conducted separately through the condenser unit. Thus, a single air circulating fan 54 is required. The air which is heated by being passed over the condenser coils is utilized in the present embodiment as the air inlet to the gas fire box 23 to utilize the heated air for more efficient operation of the boiler. Thus an enclosure 70 is shown within the dotted line for conducting the heated air passed through the condensers to the air inlet of the boiler heating unit.

What is claimed is:

1. A heating and cooling apparatus comprising: an evaporator, a fluid compressor, a prime mover connected to said compressor, a heat source, a first conduit circuit coupled to said heat source and said evaporator, said first conduit circuit including valve means for selectively interconnecting said heat source and said evaporator, a heating fluid conducted by said first conduit circuit, a second conduit circuit coupled to said heat source and said prime mover, said second conduit circuit including valve means for selectively interconnecting said heat source to said prime mover for driving said prime mover, said heating fluid being selectively conducted to said prime mover by said second conduit circuit, a third conduit circuit coupled to said compressor and said evaporator, said third conduit circuit including valve means for selectively interconnecting said compressor and said evaporator, a cooling fluid, said cooling fluid being selectively conducted by said third conduit circuit from said compressor to said evaporator, a condenser unit in said third conduit circuit between said evaporator and said compressor, a bleeder conduit affixed to the point of connection between said prime mover and said compressor for conducting admixed fluids from said connecting point; a fluid separator, said bleeder conduit being connected to the inlet of said fluid separator, a heating fluid outlet line from said separator for conducting said heating fluid to said first conduit circuit and a cooling fluid outlet line from said separator for conducting said cooling fluid to said third conduit circuit.

2. A heating and cooling apparatus comprising: an evaporator, a fluid compressor, a prime mover connected to said compressor, a heat source, a first conduit circuit coupled to said heat source and said evaporator, said first conduit circuit including valve means for selectively interconnecting said heat source and said evaporator for conducting a heating fluid to said evaporator, a second conduit circuit coupled to said heat source and said prime mover, said second conduit circuit including valve means for selectively interconnecting said heat source to said prime mover for driving said prime mover, a third conduit circuit coupled to said compressor and said evaporator, said third conduit circuit including valve means for selectively interconnecting said compressor and said evaporator for conducting a cooling fluid from said compressor to said evaporator, a condenser unit in said third conduit circuit between said evaporator and said compressor, a bleeder conduit affixed to the point of connection between said prime mover and said compressor for conducting admixed fluids from said connecting point; a fluid separator, said bleeder conduit connected to the inlet of said fluid separator, a first fluid outlet line from said separator for conducting said heating fluid to said first conduit circuit and a second fluid outlet line from said separator for conducting said cooling fluid to said third conduit circuit.

3. A heating and cooling apparatus comprising: an evaporator; a fluid compressor; a prime mover, said prime mover and compressor being mounted upon a common shaft; a heat source, a first conduit circuit coupled to said heat source and said evaporator, said first conduit circuit including valve means for selectively interconnecting said heat source and said evaporator for conducting a heating fluid to said evaporator; a second conduit circuit coupled to said heat source and to said prime mover, said second conduit circuit including valve means for selectively interconnecting said heat source to said prime mover for driving said prime mover; a third conduit circuit coupled to said compressor and said evaporator, said third conduit circuit including valve means for selectively interconnecting said compressor and said evaporator for conducting a cooling fluid from said compressor to said evaporator, a condenser unit in said third conduit circuit between said evaporator and said compressor; a bleeder conduit connected to said common shaft between said prime mover and said compressor for conducting admixed fluids from said common shaft; a fluid separator, said bleeder conduit being connected to said fluid separator, a first fluid outlet line from said separator for conducting said heating fluid to said first conduit circuit and a second fluid outlet line from said separator for conducting said cooling fluid to said third conduit circuit.

4. A heating and cooling apparatus comprising: an evaporator; a fluid compressor; a prime mover, said prime mover and compressor being mounted upon a common shaft; a heat source, a first conduit circuit coupled to said heat source and said evaporator, said first conduit circuit including valve means for selectively interconnecting said heat source and said evaporator for conducting a heating fluid to said evaporator; a second conduit circuit coupled to said heat source and said prime mover, said second conduit circuit including valve means for selectively interconnecting said heat source to said prime mover for driving said prime mover; a third conduit circuit coupled to said compressor and said evaporator, said third conduit circuit including valve means for selectively interconnecting said compressor and said evaporator for conducting a cooling fluid from said compressor to said evaporator; a bleeder conduit connected to said common shaft between said prime mover and said compressor for conducting admixed fluids from said common shaft; a fluid separator, said bleeder conduit being connected to said fluid separator, a first fluid outlet line from said separator for conducting said heating fluid to said first conduit circuit and a second fluid outlet line from said separator for conducting said cooling fluid to said third conduit circuit; and a condenser unit having first and second sections, said first section being in said first conduit circuit between said evaporator and said heat source, said second section being in said third conduit circuit between said evaporator and said compressor.

5. In a cooling apparatus including a rotary prime mover and a rotary compressor mounted on a common shaft, wherein a refrigerant fluid is compressed by conducting it through the compressor and wherein the common shaft is rotated by a heating fluid conducted through the prime mover; means for separating admixed refrigerant and heating fluids comprising a housing defining a chamber enclosing the portion of said common shaft extending between said prime mover and said rotary compressor to confine fluids escaping from said apparatus; means for separating said admixed fluids, said separator means including an inlet port and a heating fluid outlet port and a refrigerant fluid outlet port; first conduit means coupled between said inlet port and said chamber within said housing; second conduit means coupled between said heating fluid outlet port and said prime mover; and, third conduit means coupled between said refrigerant fluid outlet port and said compressor.

6. The apparatus as defined in claim 5, wherein said separating means is a fractionating column.

References Cited in the file of this patent
UNITED STATES PATENTS

| | | |
|---|---|---|
| 977,659 | Le Blanc | Dec. 6, 1910 |
| 2,017,579 | Anderson | Oct. 15, 1935 |
| 2,729,071 | Whitney | Jan. 3, 1956 |